United States Patent
Pierrugues et al.

(10) Patent No.: US 11,336,340 B2
(45) Date of Patent: May 17, 2022

(54) BEAMFORMING PERFORMANCE OPTIMIZATION

(71) Applicant: SEMICONDUCTOR COMPONENTS INDUSTRIES, LLC, Phoenix, AZ (US)

(72) Inventors: Laurent Alexandre Pierrugues, San Jose, CA (US); Vladimir Isaev, Saint Petersburg (RU); Konstantin Sergeevich Stepanov, Saint Petersburg (RU); Dmitrii Lebed, Milpitas, CA (US); Kapil Gulati, Sunnyvale, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 14 days.

(21) Appl. No.: 16/987,572

(22) Filed: Aug. 7, 2020

(65) Prior Publication Data
US 2021/0067212 A1 Mar. 4, 2021

Related U.S. Application Data

(60) Provisional application No. 62/892,852, filed on Aug. 28, 2019.

(51) Int. Cl.
*H04L 27/00* (2006.01)
*H04B 7/0456* (2017.01)
(Continued)

(52) U.S. Cl.
CPC ......... *H04B 7/0456* (2013.01); *H04B 7/0417* (2013.01); *H04B 7/0452* (2013.01);
(Continued)

(58) Field of Classification Search
CPC . H04L 27/22; H04L 27/2332; H04L 25/9224; H04L 27/2646; H04L 7/0641; H04L 7/0643; H04B 7/0619; H04B 7/0663
(Continued)

(56) References Cited

U.S. PATENT DOCUMENTS 8,305,921 B2 11/2012 Narasimhan et al.
8,358,588 B2 1/2013 Goldsmith et al.
(Continued)

*Primary Examiner* — Khai Tran
(74) *Attorney, Agent, or Firm* — Maschoff Brennan

(57) ABSTRACT

An example method may include determining a first precoding processing for communication between a beamformer and a beamformee, and transmitting a first sounding signal precoded according to the first precoding processing. The method also includes obtaining first beamforming feedback from the beamformee in response to the first sounding signal, and selecting a second precoding processing for communication between the beamformer and the beamformee. The method also includes obtaining second beamforming feedback from the beamformee based on a second sounding signal from the beamformer preprocessed according to the second precoding processing, and analyzing the first beamforming feedback and the second beamforming feedback. The method additionally includes deriving a quality score of the second precoding processing based on the analysis of the first beamforming feedback and the second beamforming feedback, and selecting the second precoding processing instead of the first precoding processing based on the quality score of the second precoding processing.

20 Claims, 11 Drawing Sheets

(51) Int. Cl.
- *H04B 7/0417* (2017.01)
- *H04B 7/06* (2006.01)
- *H04B 17/318* (2015.01)
- *H04B 7/0452* (2017.01)
- *H04L 25/02* (2006.01)

(52) U.S. Cl.
CPC ......... *H04B 7/0617* (2013.01); *H04B 7/0632* (2013.01); *H04B 17/318* (2015.01); *H04L 25/0226* (2013.01)

(58) Field of Classification Search
USPC ........................................ 375/329, 260, 267
See application file for complete search history.

(56) References Cited

U.S. PATENT DOCUMENTS

| | | | | |
|---|---|---|---|---|
| 2014/0153415 A1* | 6/2014 | Choudhury | ........... | H04W 48/00 |
| | | | | 370/252 |
| 2019/0363764 A1* | 11/2019 | Patwardhan | ......... | H04B 7/0456 |
| 2020/0052762 A1* | 2/2020 | Yang | .................... | H04B 7/0619 |
| 2020/0195315 A1* | 6/2020 | Wang | ................... | H04L 1/0026 |

* cited by examiner

BEAMFORMING PERFORMANCE OPTIMIZATION

CROSS-REFERENCE TO RELATED APPLICATION

This patent application claims the benefit of and priority to U.S. Provisional App. No. 62/892,852 filed Aug. 28, 2019, which is incorporated by reference in the present disclosure in its entirety for all that it discloses.

FIELD

The implementations discussed herein are related to beamforming performance metrics. In particular, the present disclosure may relate to the tracking, analysis, and/or use of beamforming performance metrics and optimization.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax", "ay", "be". Communications follow a hub and spoke model with a WAP at the hub and the spokes corresponding to the wireless links to each 'client' device or station (STA) utilizing the WLAN.

However, when beamforming for packet transmission from the WAP (or other technologies that use beamforming), some circumstances lead to inefficient or incomplete understanding of the performance of the beamformed signal.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to tracking, analysis, and/or use of beamforming performance metrics and optimization. Some implementations provide a method, system, and/or apparatus to facilitate tracking, analysis, and/or use of beamforming performance metrics.

One or more embodiments may include an example method that includes determining a first precoding processing for communication between a beamformer and a beamformee, and transmitting a first sounding signal precoded according to the first precoding processing. The method may additionally include obtaining first beamforming feedback from the beamformee in response to the first sounding signal precoded according to the first precoding processing, and selecting a second precoding processing for communication between the beamformer and the beamformee. The method may also include obtaining second beamforming feedback from the beamformee based on a second sounding signal precoded according to the second precoding processing, and analyzing the first beamforming feedback and the second beamforming feedback. The method may additionally include deriving a quality score of the second precoding processing based on the analysis of the first beamforming feedback and the second beamforming feedback, and selecting the second precoding processing instead of the first precoding processing based on the quality score of the second precoding processing.

The present disclosure may be implemented in hardware, firmware, or software. Associated devices and circuits are also claimed. Additional features and advantages of the present disclosure will be set forth in the description which follows, and in part will be obvious from the present disclosure, or may be learned by the practice of the present disclosure. The features and advantages of the present disclosure may be realized and obtained by means of the instruments and combinations particularly pointed out in the appended claims. These and other features of the present disclosure will become more fully apparent from the following description and appended claims or may be learned by the practice of the present disclosure as set forth hereinafter.

BRIEF DESCRIPTION OF THE DRAWINGS

To further clarify the above and other advantages and features of the present disclosure, a more particular description of the present disclosure will be rendered by reference to specific implementations thereof which are illustrated in the appended drawings. It is appreciated that these drawings depict only typical implementations of the present disclosure and are therefore not to be considered limiting of its scope. The present disclosure will be described and explained with additional specificity and detail using the accompanying drawings in which.

DETAILED DESCRIPTION OF SOME EXAMPLE IMPLEMENTATIONS

Figure 1A:
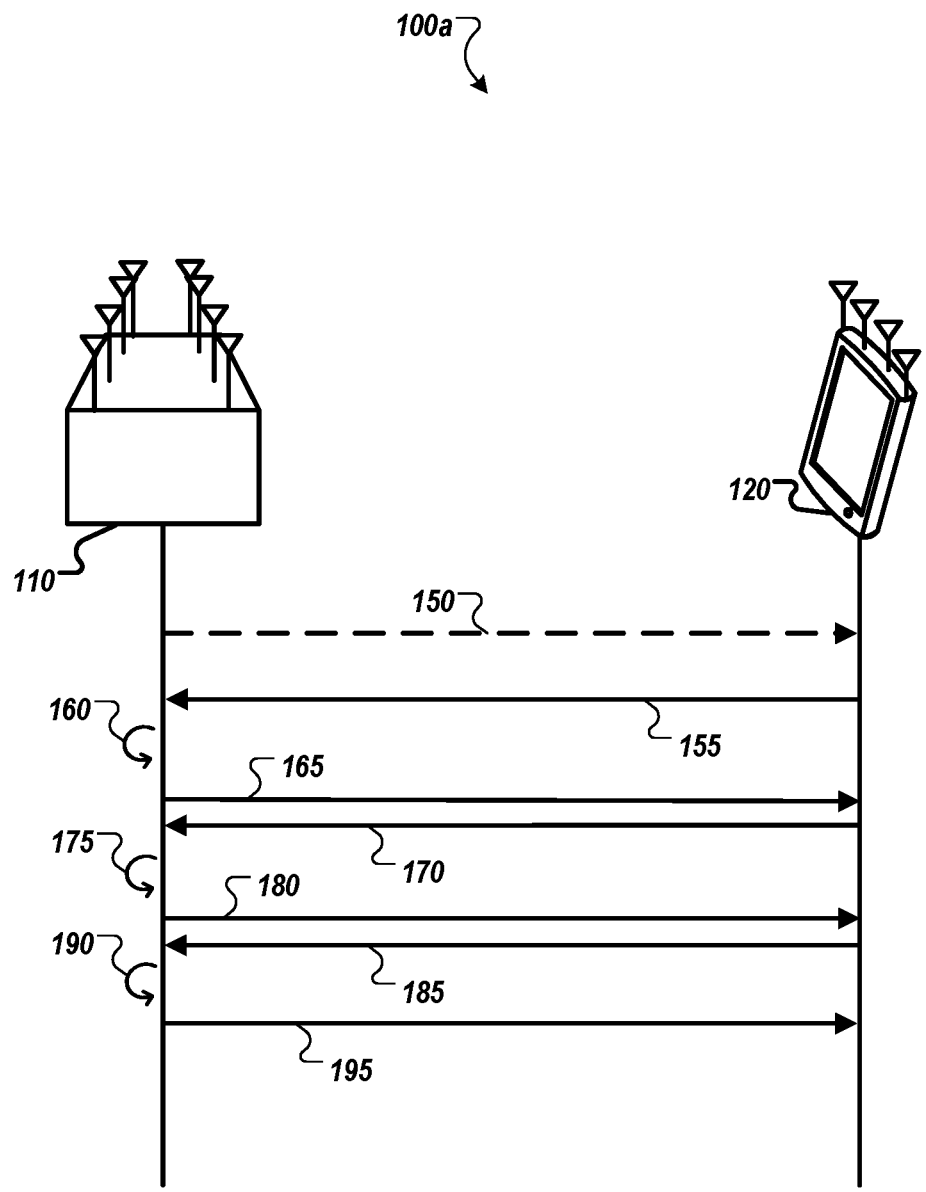
FIG. 1A illustrates an example environment within which beamforming performance metrics may be tracked, analyzed, and/or used with use of a single beamformee.

Implementations described herein may generally include an approach to identifying and/or monitoring the effectiveness of precoding and/or steering in a digital communication system to optimize or otherwise improve communication. A first device (e.g., a beamformer) may determine a first precoding technique to be used, and send a first sounding signal using the first precoding technique to a second device (e.g., a beamformee) in a downlink direction. The first device may receive first feedback from the second device regarding the channel of communication between the two devices. The first device may then change from the first precoding technique to a second precoding technique and send a second sounding signal using the second precoding technique. The first device may receive second feedback from the second device based on the second sounding signal. Using the successive feedbacks based on different precoding techniques, the first device (e.g., the beamformer) may be able to analyze the two precoding techniques and determine which is superior in performance such that the superior precoding technique may be used when communicating with the second device (e.g., the beamformee). Additionally, such analyses may facilitate optimization of beamforming and steering of concurrent and/or subsequent transmissions between the devices.

In some embodiments, such techniques may facilitate analysis of beamforming. For example, when first determining a precoding technique for beamforming, the beamformee may send beamforming feedback that may be used by the beamformer to select an initial precoding technique for communication with the beamformee. Rather than simply using the precoding technique, the precoding technique itself may be analyzed by sending successive sounding signals processed using the initial precoding technique, followed by a different precoding technique. The differences in the beamforming feedback may be used to determine the quality of the initial precoding technique and/or the other precoding techniques, and correspondingly, the effectiveness of the beamforming.

In addition to determining the quality of the precoding, such information may be used to analyze or quantify the quality of other aspects of beamformed communication, such as transmission quality for a particular frequency, antenna performance, performance between precoding techniques, etc., and/or combinations thereof. While wireless communication, such as WiFi communication between an access point and a station, is frequently used throughout the present disclosure as an example of using multiple sounding signals, it will be appreciated that this is merely a non-limiting example. The same principles are also applicable to other communication modalities, such as optical communication, Digital Subscriber Line (DSL) communications, or any other digital communication technique or device. Additionally, the techniques described herein may be used for a variety of other applications such as motion detection, presence detection, device authentication, building automation, premise security, acoustic signal processing, etc.

By using one or more of the principles of the present disclosure to derive a steering matrix, network performance may be improved and/or efficiencies may be gained. For example, a station may be able to receive a signal from further away and/or with higher throughput because of improved beamforming based on identifying a precoding technique, antenna configuration, and/or frequency with improved beamforming performance. Additionally, the system may reduce power consumption by turning off beamforming, using a reduced number of antennas, reducing broadcast strength, etc. based on identifying the beamforming performance with such variations.

Reference will now be made to the drawings to describe various aspects of example implementations of the present disclosure. It is to be understood that the drawings are diagrammatic and schematic representations of such example implementations, and are not limiting of the present disclosure, nor are they necessarily drawn to scale.

FIG. 1A illustrates an example environment 100a within which beamforming performance metrics may be tracked, analyzed, and/or used, in accordance with one or more embodiments of the present disclosure. For simplicity, the environment is illustrated with one AP 110 and one station 120 as the beamformer/beamformee. Within the environment 100a, the AP 110 and the station 120 may wirelessly communicate with each other. It will be appreciated that the principles of the present disclosure are applicable to any number of APs communicating with any number of stations, and to any style of communication between a beamformer/beamformee, such as cellular communications, some wireline communications, etc. and that the use of an AP and station is simply for convenience and is not so limited.

In operation, the AP 110 may announce and/or transmit a null data packet (NDP) as an initial sounding signal 150. For example, an explicit sounding may be initiated by the AP 110 sending an NDP Announcement (NDPA) frame. The NDPA identifies the AP 110 and the target recipient station(s) (e.g., the station 120) for the sounding. Next, the AP 110 may send the initial sounding signal 150. The sounding signal may include the NDP that is a limited packet that includes a common preamble field in the header of the packet, rather than user data. For example, the IEEE 802.1 lac standard identifies the preamble field as the VHT-LTF field (very high throughput long training field). The LTF field may include a long training sequence used for multi-input multi-output (MIMO) channel estimation by the station 120. The station 120 may determine the corresponding beamforming matrix to adjust the phase and amplitude of subsequent MIMO transmissions by the AP 110 so as to improve the received signal strength at the station 120. The station 120 may then respond with a communication 155 that includes initial beamforming that may include a unity vector (V) representative of a phase per transmit and receive antenna, and the eigen values of the channel as a vector (S) that may be proportional to the signal to noise ratio (SNR) for a particular data stream.

In some embodiments, the AP 110 may utilize implicit sounding to determine an initial precoding technique. For example, rather than sending the initial sounding signal 150, the AP 110 may monitor the communication 155 in the uplink direction and may use that information to predict characteristics of the downlink channel between the AP 110 and the station 120.

In some embodiments, the operation 160 may represent the AP 110 determining an initial precoding technique to be used when deriving the steering matrix Q for communicating with the station 120. For example, the determination may be made based on the feedback/communication 155. Additionally or alternatively, the selection may be a default of the AP 110 and/or the station 120. Examples of such precoding techniques may include zero-forcing (ZF) precoding, such as using discrete Fourier transforms (DFT) and/or orthogonal spreading of transmission patterns, minimum mean squared error (MMSE) precoding, such as weighted MMSE (WMMSE), optimal iterative WMMSE (IWMSSE), maximum ratio transmission (MRT) precoding, projection precoding, etc. In some embodiments, the precoding technique may be a neutral or base precoding technique from which other precoding techniques may be readily analyzed and/or compared.

After determining the steering matrix Q, the AP 110 may send a second sounding signal 165 with the steering matrix Q applied to the second sounding signal 165 (e.g., the second sounding signal 165 is precoded using the initial precoding technique). In response, the station 120 may respond to the second sounding signal 165 with second beamforming feedback 170. Feedback of the initial communication 155 of beamforming feedback 155 may be characterized as $V_1$, $S_1$ and the second beamforming feedback may be characterized as $V_2$, $S_2$.

The operation 175 may represent analysis performed by the AP 110 based on the beamforming feedback. In some embodiments, the quality of the steering matrix Q may be determined by analyzing $V_2$ with respect to the identity matrix. For example, an effective steering matrix may include a matrix close to the identity matrix. In some embodiments, by analyzing $S_2$ and $S_1$ with respect to each other, the relative gain in signal strength may be observed between using precoding and no precoding. By way of numerical example, a first matrix may include values in $V_2$ of $$\begin{bmatrix} -0.6 - 0.75i & 0.04 + 0.04i \\ 0.06 + 0.00i & 0.99 + 0.00i \end{bmatrix}$$

and a second matrix may include values in $V_2$ of $$\begin{bmatrix} 0.43 - 0.56i & -0.42 + 0.56i \\ 0.70 + 0.00i & 0.71 + 0.00i \end{bmatrix}$$

As can be seen in the two matrices, the first matrix is close to the identity matrix, indicating a high performance of the steering matrix while the high non-zero values in the non-diagonal elements of the second matrix indicates a poor performance of the steering matrix. In some embodiments, the value of V/Q may be used to observe a normalized correlation of the performance of a precoding technique such that changes over time may be observed and/or tracked.

The sounding signal(s) 180 and the beamforming feedback 185 may represent one or more iterations of sending sounding signals 180 from the AP 110 and receiving the feedback 185 from the station 120. By iteratively seeking and obtaining the feedback, various parameters regarding performance of the communication between the AP 110 and the station 120 may be observed. In some embodiments, the iterative sounding signal(s) 180 and beamforming feedback 185 may be performed periodically, or may be performed continuously, or may be triggered by some event (e.g., accessing a new AP, an error, crossing a threshold performance level, etc.). For example, the sounding signal(s) 180 and the beamforming feedback 185 may be obtained every 60 ms, 90 ms, every 120 ms, every 1-5 seconds, etc. In some embodiments, the repetitive sending of sounding signals 180 may be referred to as a probing mode in which variations in the precoding techniques and/or transmission configurations are probed to identify an optimized and/or improved precoding technique and/or transmission configuration.

In some embodiments, various aspects of the communication and/or channel may be changed between iterations of the sounding signal(s) 180 and the beamforming feedback 185. For example, the type of precoding technique used may be varied between iterations (e.g., one is precoded using a DFT precoding technique and another is precoded using an OS precoding technique). By changing the precoding technique between different sounding signals, the performance of the different precoding techniques may be analyzed such that the superior precoding technique may be used in concurrent and/or subsequent communications between the AP 110 and the station 120.

In some embodiments, other aspects of the sounding signal may be modified between later sounding signals. For example, the set of antennas may be varied between iterations (e.g., one is transmitted with antennas 1-7 and another is transmitted with antennas 2>8), the frequency used may be varied between transmissions (e.g., one is transmitted at a first resource unit (RU) or bandwidth and another is transmitted at a second RU or bandwidth), or any other iterations or combinations that may affect the transmission capabilities between the AP 110 and the station 120.

The operation 190 may represent analysis performed by the AP 110 on the different beamforming feedback(s) 185 received from the station 120. For example, the AP 110 may analyze the beamforming feedback for two (or more) different precoding techniques and select the one that generates the highest SNR as determined by analyzing values of S between the beamforming feedbacks. As another example, the AP 110 may analyze the beamforming feedback for two different RU used during transmission and select the more favorable. As a further example, the AP 110 may analyze different 4×8 antenna configurations when communicating between the AP 110 and the station 120 and select the one with the highest beamforming feedback performance (such as the highest SNR as determined by analyzing values of S between the beamforming feedbacks). As an additional example, the AP 110 may monitor changes in the beamforming feedback over time to determine whether or not the station 120 has changed locations or is moving. As a further example, the AP 110 may characterize the stability of the channel based on monitoring the beamforming feedback over time.

In some embodiments, the sounding signal(s) 180 and the beamforming feedback 185 may be used often in an early phase of communications between the station 120 and the AP 110 and may be later scaled back in frequency as particular aspects are determined (e.g., which antenna configuration and precoding technique is preferred). In some embodiments, the sounding signal(s) 180 and the beamforming feedback 185 may be sent continuously or nearly continuously in a debugging mode that may facilitate obtaining large amounts of data regarding the channel performance between the station 120 and the AP 110 based on variations in the beamforming feedback 185.

In some embodiments, the sounding signal(s) 180 and the beamforming feedback 185 may be used to modify or remove potential precoding techniques from being probed by the AP 110 when sending sounding signals. For example, if a given precoding technique consistently underperforms compared to other precoding techniques for a given station and/or in given environments, the AP 110 may identify the given station and/or given environment and may disable the given precoding technique for those circumstances. As another example, the AP 110 may disable the given precoding techniques and may periodically (e.g., once per day) probe the disabled precoding techniques to verify their continued poor performance. In these and other embodiments, the use of such techniques may facilitate the identification, learning, and/or prediction of various environmental considerations and/or antenna configuration considerations based on the monitored feedback and patterns observed in certain context and not in others. For example, if a particular environmental feature or characteristic is observed by the AP 110 to repeatedly cause poor performance of a given precoding technique, observation of poor performance of the given precoding technique may facilitate prediction of the presence of the particular environmental feature or characteristic.

After making particular determinations regarding the communication channel and modality between the AP 110 and the station 120 (e.g., which precoding technique, antenna configuration, RU, broadcast strength, etc. is desirable), the AP 110 may communicate data packets 195 using such settings.

Figure 1B:
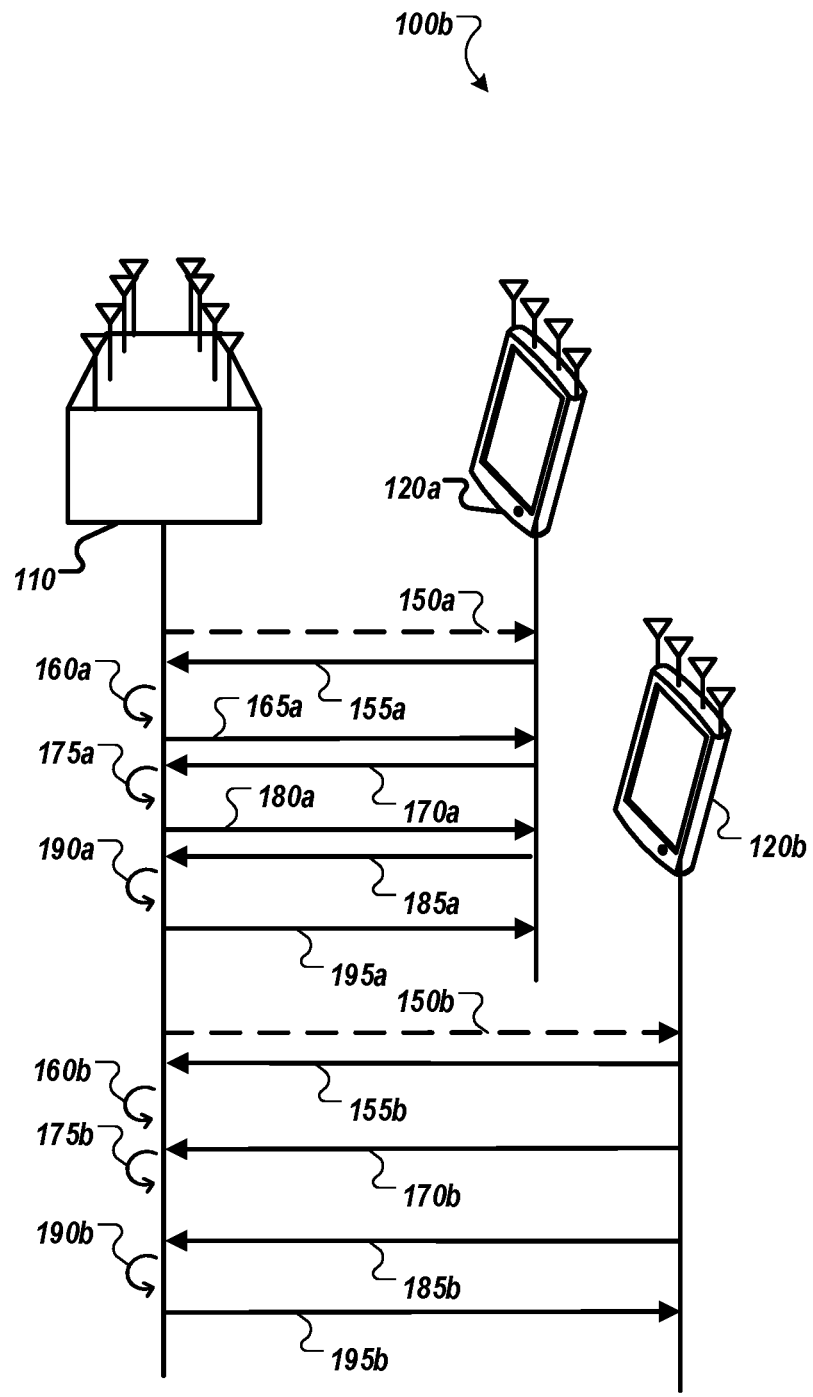
FIG. 1B illustrates another example environment within which beamforming performance metrics may be tracked, analyzed, and/or used with reference to multiple beamformees.

While described with reference to a single AP 110 and station 120, it will be appreciated that the same concept is equally applicable to multiple stations that are responding to sounding signals such that the AP 110 may perform the same comparisons and/or analyses for each station being serviced by the AP 110 (an example of which is illustrated in FIG. 1B) and/or to contexts with multiple APs. For example, in some embodiments, between multiple stations, some stations may receive beamforming to increase the signal strength for the station while others may have beamforming disabled as the SNR difference between beamformed communications and non-beamformed communications may be low. As another example, in a mesh network, first feedback from sounding signals for one AP to a station may be monitored and analyzed with respect to second feedback from sounding signals for another AP communicating with the station. The SNR in beamforming between the two APs may be analyzed and the AP with the superior SNR performance may be selected to communicate with the station.

While described with reference to explicit feedback to learn the downlink channel between the AP 110 and the station 120, it will be appreciated that the same concepts may be applied to implicit feedback in which communications in the uplink channel are monitored to derive information regarding the downlink channel. Explicit sounding and feedback approaches generally use sounding feedback for the downlink/forward channel to determine precoding for the downlink/forward channel. Implicit feedback and sounding approaches generally estimate the downlink/forward channel based on characteristics of the uplink/reverse channel. In some embodiments, the AP 110 may determine an initial precoding technique based on implicit sounding and feedback and/or may vary which precoding technique is being used based on implicit sounding and feedback. After selecting and/or changing precoding techniques, the AP 110 may send a sounding signal using the new precoding technique to facilitate determination and analysis of the performance of the new precoding technique. As another example, the AP 110 may vary which antennas and/or configurations of antennas are being used and continue to monitor variations in the observations of the uplink channel. As a further example, other devices or systems that use variations on implicit sounding may be used. For example, wireless ear sets may use implicit sounding to beamform signals between a host device and the wireless ear units. For example, the host device may perform beamforming based on echo or other audio sounds picked up by the host device, and the same principles regarding analyzing beamforming performance based on varying the beamforming techniques and monitoring the implicit feedback may be used in such circumstances.

While described as the AP 110 performing processing and analysis to compare the multiple sets of feedback responsive to the sounding signals, it will be appreciated that the AP 110 may collect the feedback via which the processing and analysis may be performed and may provide the feedback to a cloud-based system which may perform the processing and analysis. Additionally or alternatively, the AP 110 may collect the feedback but may delay performing the processing and analysis. For example, the AP 110 may delay until a time when traffic has decreased and more processing power of the AP 110 is available to dedicate to processing and analysis of the feedback without negatively impacting traffic processing by the AP 110 beyond a threshold amount.

Modifications, additions, or omissions may be made to the environment 100a without departing from the scope of the present disclosure. For example, the designations of different elements in the manner described is meant to help explain concepts described herein and is not limiting. Further, the environment 100a may include any number of other elements or may be implemented within other systems or contexts than those described. For example, any number of APs 110 and/or stations 120 may be included. While one mathematical approach is illustrated for determining and combining the correlational relationships between the antennas, any such mathematical approach is contemplated.

Additionally, the teachings are applicable to any type of wireless communication system or other digital communication systems. For example, while stations and access points are described for one context of wireless communication, the teachings of the iterative sounding to improve beamforming are also applicable to other wireless communication such as Bluetooth®, Bluetooth Low Energy, Zigbee®, Thread, mmWave, etc., and may be particularly applicable to any technology that uses beamforming. Additionally, the teachings are applicable to other physical communication modalities such as transmission lines for DSL or optical cables for optical networks that use beamforming or other steering techniques.

FIG. 1B illustrates another example environment 100b within which beamforming performance metrics may be tracked, analyzed, and/or used, in accordance with one or more embodiments of the present disclosure. FIG. 1B may be similar or comparable to FIG. 1A. In particular, the processes of selecting precoding techniques, sending sounding signals, and analyzing the sounding signals may be similar or comparable to that described above for FIG. 1A. For example, the sounding signals 150a/b may be similar or comparable to the sounding signal 150, the communications 155a/b may be similar or comparable to the communication 155, the operations 160a/b may be similar or comparable to the operation 160, the feedback 170a/b may be similar/comparable to the feedback 170, the operations 175a/b may be similar or comparable to the operation 175, the sounding signals 180a/b may be similar or comparable to the sounding signal 150, the feedback 185a/b may be similar/comparable to the feedback 185, the operations 190a/b may be similar or comparable to the operation 190, and the communication of data packets 195a/b may be similar or comparable to the communication of data packets 195.

The environment 100b includes both a first station 120a and a second station 120b as the beamformees. As illustrated in FIG. 1B, each station 120a/120b may receive distinct sounding signals precoded using distinct precoding techniques such that the AP 110 may analyze each station 120a/120b independently. For example, the downlink/forward channel between the station 120a and the AP 110 may be different than the downlink/forward channel between the station 120b and the AP 110. Because of the differences, different precoding techniques may have different effects on the performance of beamforming to the two different stations 120a/120b.

In some embodiments, in the operations 190a/190b, the AP 110 may compare the relative performance gains for beamforming between the stations 120a and 120b. For example, the AP 110 may determine that the first station 120a enjoys a significantly larger gain in SNR via beamforming, while the second station 120b has a low gain in SNR via beamforming. In these and other embodiments, the AP 110 may disable beamforming for the second station 120b such that the data packet communication 195b may be transmitted without beamforming.

In some embodiments, as the number of stations serviced by the AP 110 increases, at some point the AP 110 may no longer have sufficient computing resources, networking resources (e.g., air time), etc. to perform beamforming to all of the stations. In these and other embodiments, the AP 110 may utilize a comparison between stations (such as between the stations 120a and 120b) of their relative performance gains in using beamforming. The AP 110 may elect to disable beamforming for some stations (e.g., the station 120b) while enabling, enhancing, and/or optimizing beamforming for others (e.g., the station 120a).

In some embodiments, the AP 110 may or may not be configured to periodically probe all of the stations, or the stations for which beamforming is disabled, or some subset thereof, to verify whether or not it is still advantageous to disable beamforming for the stations. In these and other embodiments, based on one or more of the stations (such as the station 120b) indicating a significant increase in performance due to beamforming compared to previous analyses (e.g., the analyses that led to beamforming being disabled for the second station 120b), the AP 110 may enable, enhance, and/or optimize beamforming for one or more of the stations for which it was disabled.

While FIG. 1B illustrates two stations 120a/b, it will be appreciated that any number of stations, such as hundreds, thousands, or more, are contemplated as being in communication with the AP 110.

Figure 2A:
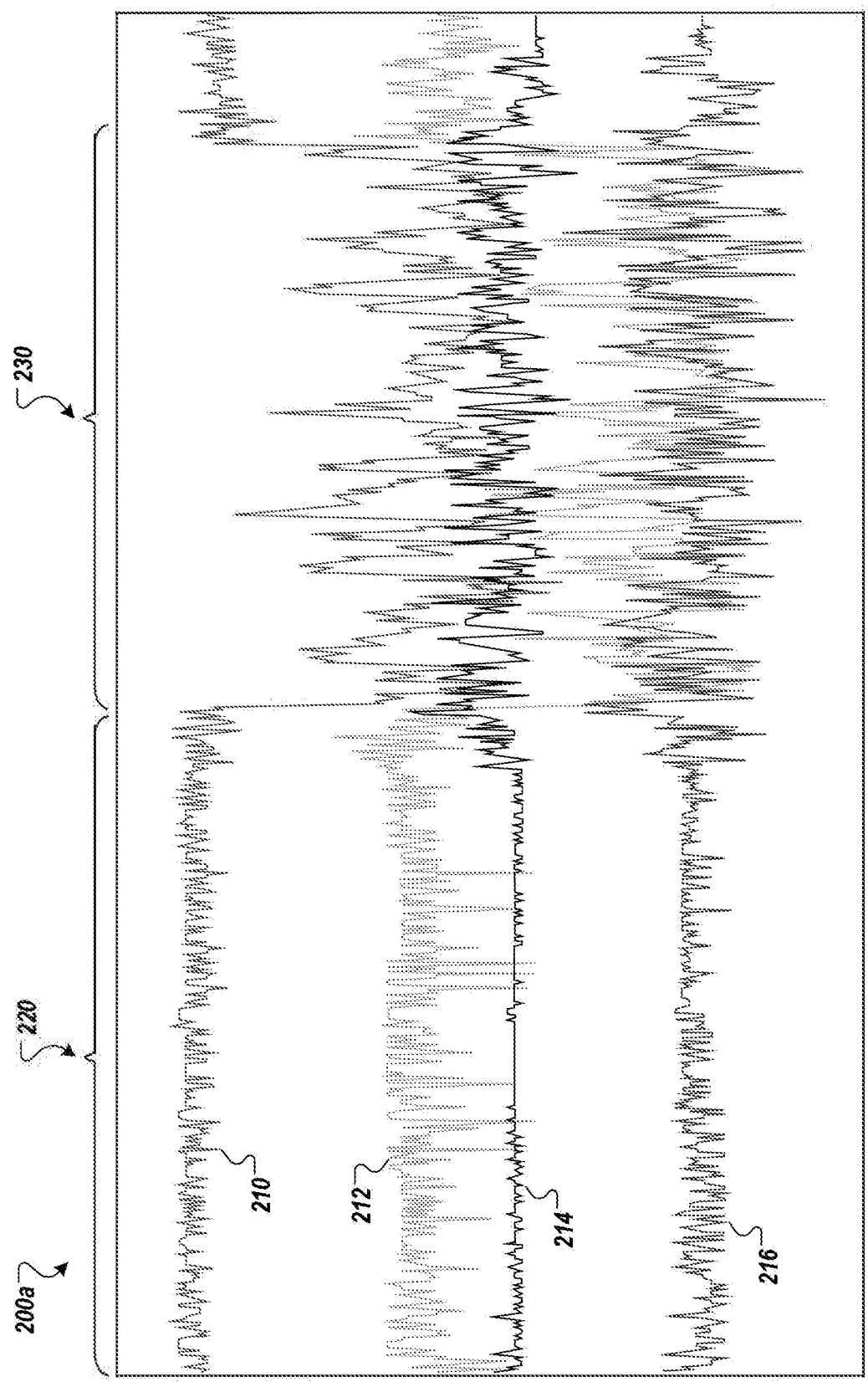
FIGS. 2A and 2B illustrates graphs of various beamforming performance metrics.
Figure 2B:
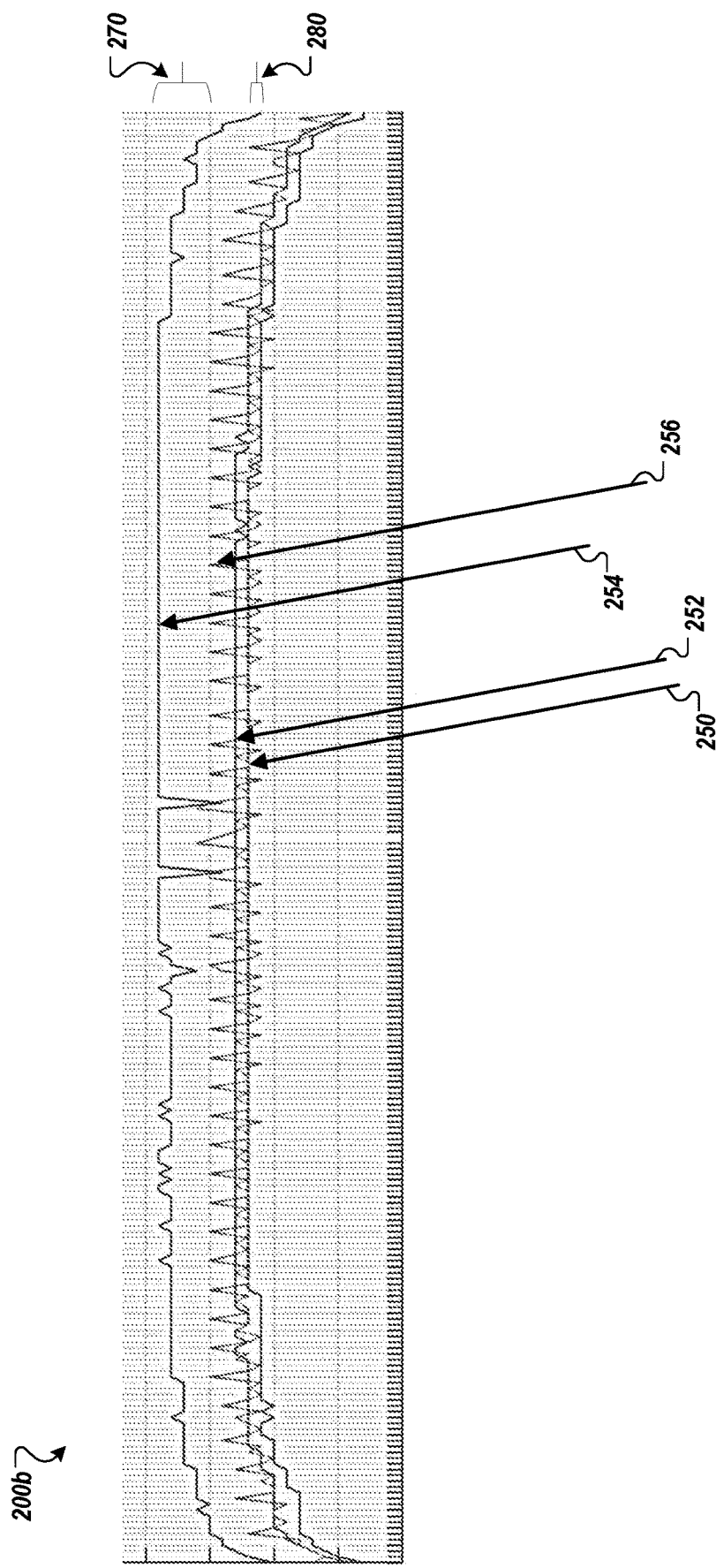

FIGS. 2A and 2B illustrates graphs 200a and 200b, respectively of various beamforming performance metrics, in accordance with one or more embodiments of the present disclosure. FIG. 2A may visually depict tracking SNR over time across four streams to facilitate detecting motion of a beamformee (e.g., station 120 of FIG. 1A). FIG. 2B may visually depict tracking performance across different RUs in an orthogonal frequency-division multiple access (OFDMA) transmission modality.

As illustrated in FIG. 2A, the graph 200a includes four data streams 210, 212, 214, and 216 of communication between a beamformer and a beamformee. The SNR of each stream may be tracked over time, e.g., by plotting S over time for each of the streams 210, 212, 214, and 216. As illustrated in FIG. 2A, a stationary period 220 and a motion period 230 may be observed. For example, there are periods (such as the stationary period 220) when the SNR of each stream is within a threshold range of variance, indicating that the beamformee is stationary. Additionally, there are periods (such as the motion period 230) when the SNR of one or more of the streams exceeds the threshold range of variance, indicating that the beamformee is in motion. Using such techniques, the beamformer may predict when the beamformee is in motion based on periods of instability in SNR, etc.

While the graph 200a illustrates the tracking of SNR based on S over time, it will be appreciated that any number of factors may be monitored over time, such as V/Q, etc.

While the graph 2A illustrates the detection of motion, it will be appreciated that the principle of multiple sounding signals and monitoring the feedback based on the sounding signals may be used for other purposes as well, such as device authentication, building automation, etc. For example, an AP (such as the AP 110 of FIG. 1A) may monitor channel information of the channel when communicating with a given station (such as the station 120 of FIG. 1A). The next time a new device communicates with the AP and the channel is observed, if the channel information are within a threshold similarity or range of variance of the channel information previously used for communications between the AP and the given station, the new device may be authenticated as the given device because the same channel is observed by the AP. In some embodiments, the sounding signal may include some identifier such as a code, signature, pattern, or other data that is monitored in the feedback across the different channels to determine whether the identity of the device communicating over the channel can be determined.

As illustrated in FIG. 2B, the performance for transmission over particular frequencies and/or RUs may also be analyzed. Additionally or alternatively, multiple precoding techniques may be analyzed at the different frequencies and/or RUs. The graph 200b includes a depiction of frequency/RU along the horizontal axis compared to SNR along the vertical axis. The graph 200b includes plots 250 and 252 of a first and a second spatial stream using a first precoding technique (such as DFT precoding) and plots 256 and 254 of the first and second spatial streams using a second precoding technique (such as OS precoding).

When analyzing the plot 250 of the first spatial stream using the first precoding technique and the plot 252 of the second spatial stream using the first precoding technique, the beamformer may determine that there are very small gains in SNR as indicated by the gap 280. With such information, when using the first precoding technique, the beamformer may determine there may not be enough SNR gain to be worthwhile in switching from the first spatial stream to the second spatial stream. By analyzing the plot 256 of the first spatial stream using the second precoding technique and the plot 254 of the second spatial stream using the second precoding technique, the beamformer may determine that there are significant gains in SNR as illustrated by the gap 270. With such information, when using the second precoding technique, the beamformer may determine the second spatial stream may be preferred and optimize subsequent communications with the beamformee to switch to utilizing the second spatial stream.

When analyzing the plot 250 of the first spatial stream using the first precoding technique and the plot 256 of the first spatial stream using the second precoding technique, the beamformer may identify different gains at different frequencies. In an example where gain may be relatively small, and even a loss in performance at particular frequencies/RUs, the beamformer may avoid those frequencies/RUs and/or disable beamforming if the available frequencies/RUs provide small gains. When analyzing the plot 252 of the second spatial stream using the first precoding technique and the plot 254 of the second spatial stream using the second precoding technique, the beamformer may determine there is a significant gain in performance at most frequencies, although there a few frequencies where the performance drops for the plot 254. For example, using the analyzed information, when communicating over the first spatial stream, depending on the frequency, the beamformer may determine to reconfigure the communication to use either the first or the second precoding technique. As another example, when communicating over the second spatial stream, the beamformer may determine the second spatial stream performance is superior or preferred and avoid changing the communication settings with the beamformee.

As illustrated in the graph 200b, the SNR decreases at either end of the spectrum of frequencies and/or RUs. Such decreases may indicate a poor performing filter at one or both ends of the communication (e.g., the beamformer and/or the beamformee) and a setting or performance of the filter may be adjusted.

It will be appreciated that the example graphs 200a and/or 200b are merely illustrative of many of the performance factors that may be monitored, tracked, and/or utilized based on repeatedly obtaining beamforming feedback that is analyzed in view of other beamforming feedback.

Modifications, additions, or omissions may be made to the graphs 200a and 200b without departing from the scope of the present disclosure. For example, any performance metrics may be tracked and analyzed over time, over frequencies, over antennas, etc.

Figure 3:
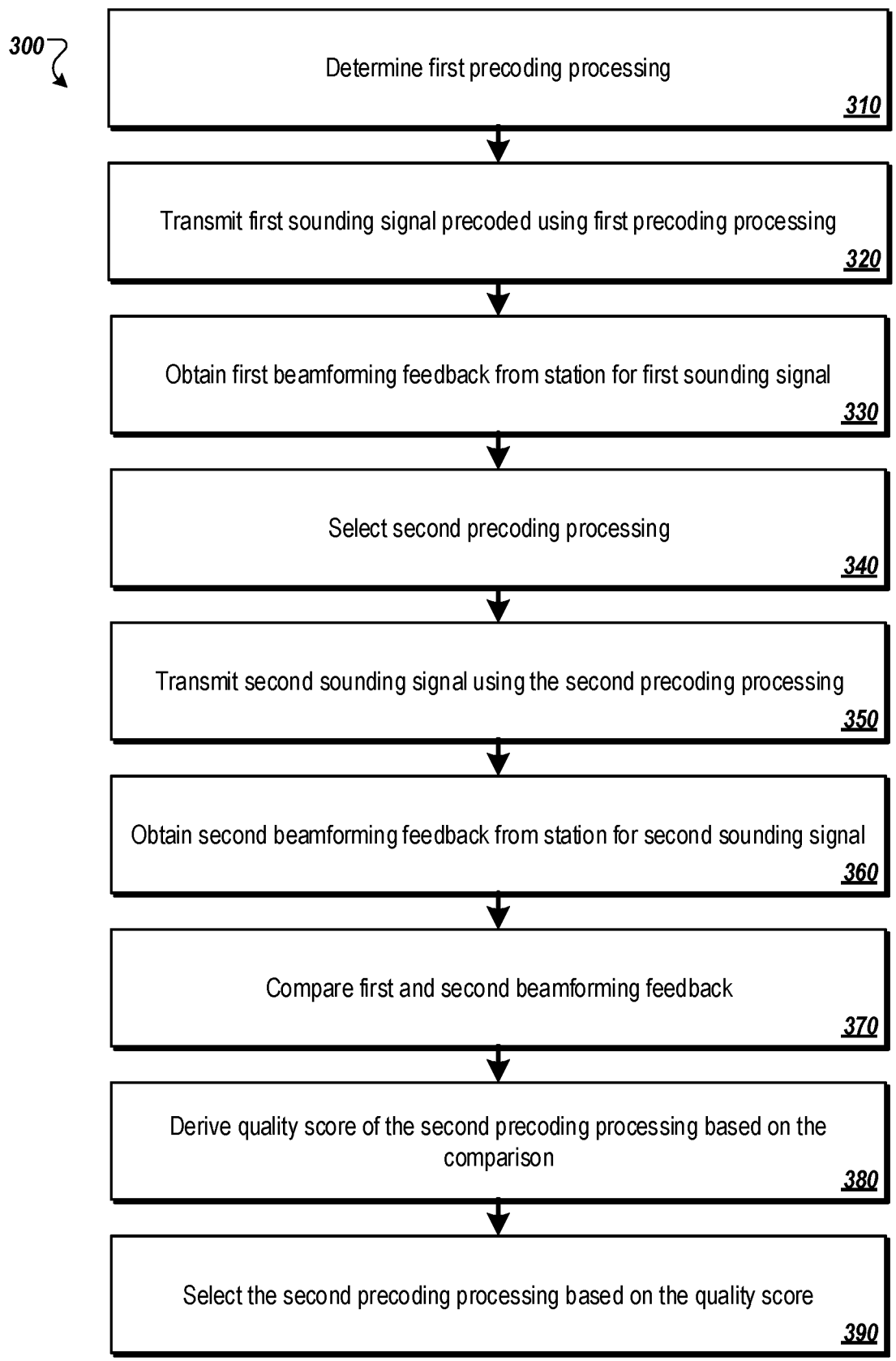
FIG. 3 illustrates a flowchart of an example method of determining beamforming performance.

FIG. 3 illustrates a flowchart of an example method 300 of determining beamforming performance, in accordance with one or more embodiments of the present disclosure. The method 300 may be implemented, in whole or in part, by the AP 110 and/or the stations 120, 120a, 120b of FIGS. 1A/1B, or by any other beamformer such as a cellular antenna and/or substation, etc.

At block 310, a first precoding processing may be determined. For example, an AP (or other beamformer) may transmit an initial sounding signal and obtain feedback via which a steering matrix Q may be derived. As another example, the AP may include a default setting of a precoding processing that may be utilized in initial communications. As a further example, the AP may utilize implicit feedback via the uplink channel to predict characteristics of the downlink channel and may derive a precoding processing accordingly.

At block 320, a first sounding signal may be transmitted using the first precoding processing determined at the block 310. For example, the AP (or other beamformer) may transmit the first sounding signal to obtain feedback to be compared with other feedback, such as when changing a precoding technique or other transmission characteristic.

At block 330, first beamforming feedback that is responsive to the first sounding signal may be obtained from a station (or other beamformee). For example, based on receiving the first sounding signal, the station may determine channel information and send feedback regarding the channel as $V_1$, $S_1$.

At block 340, second precoding processing may be selected. For example, previously used precoding processing may be selected (e.g., to monitor a channel over time, to detect motion, etc.), or a variation from the previously used precoding processing may be selected (e.g., a different precoding technique, antenna configuration, frequency, etc.).

At block 350, a second sounding signal may be transmitted using the second precoding processing selected at block 330. For example, the AP (or other beamformer) may perform the second precoding processing on the NDP before transmission.

At block 360, second beamforming feedback that is responsive to the second sounding signal may be obtained from the station (or other beamformee). For example, based on receiving the second sounding signal, the station may determine channel information and send feedback regarding the channel as $V_2$, $S_2$.

At block 370, the first and second beamforming feedback may be analyzed. For example, the AP (or other beamformer) may analyze $S_1$ in view of $S_2$, or may plot S over time, etc.

At block 380, a quality score of the precoding processing may be derived based on the analysis. For example, a high value in the difference between $S_2$ and $S_1$ may indicate good performance and the difference may be quantified as the quality score. In some embodiments, the quality score may be based on the SNR, how close the matrices $V_2$ and/or $V_2$ are to identity, or any other metrics or analyses performed based on the analysis of the first and second beamforming feedback.

At block 390, the second precoding processing may be selected based on the quality score. For example, the quality score may indicate that the performance of the second precoding processing is superior to that of the first precoding processing. It will be appreciated that either of the first and/or second precoding processing may be superior, and the superior precoding processing may be selected.

Figure 4:
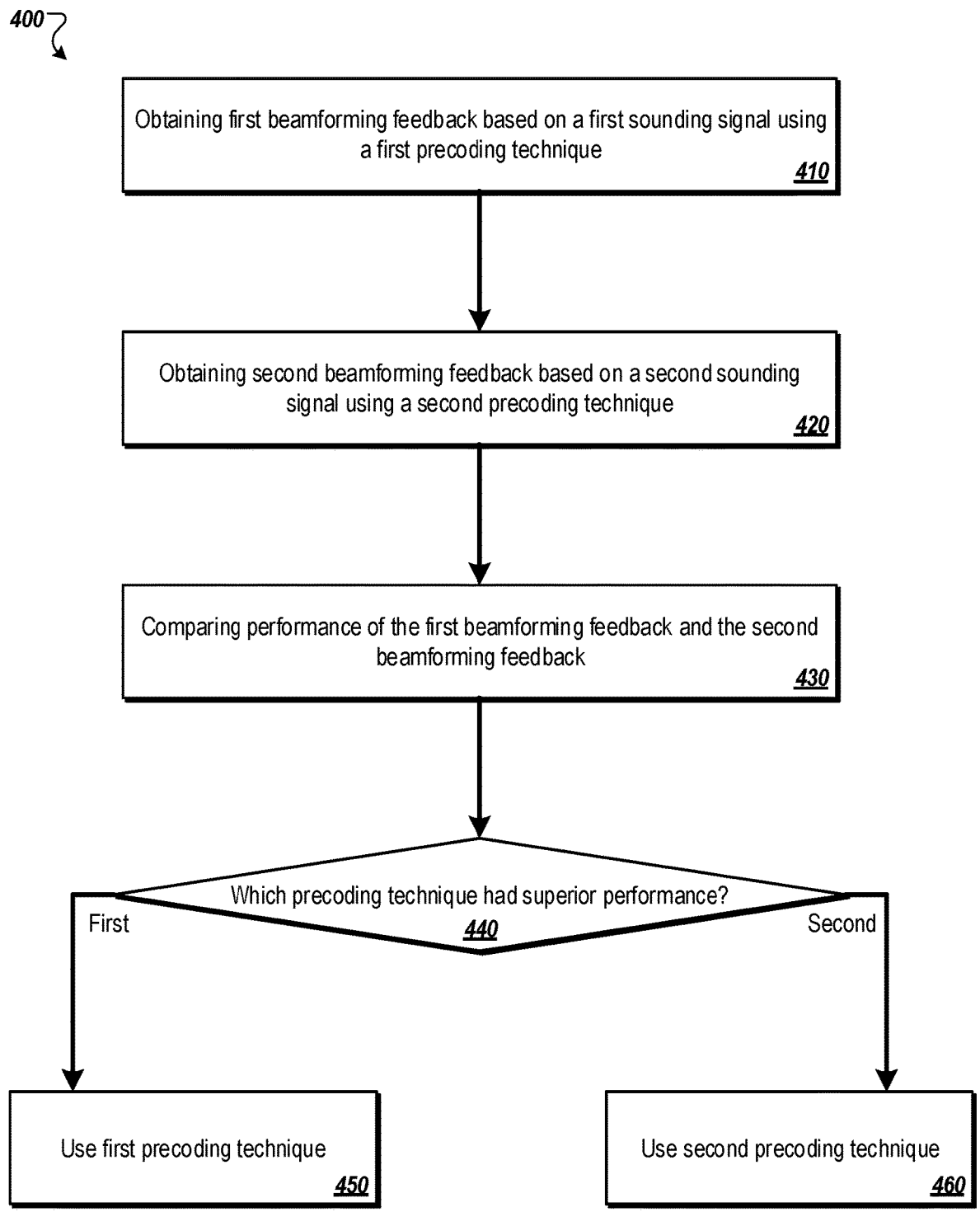
FIG. 4 illustrates a flowchart of an example method of analyzing precoding performance based on beamforming feedback.

FIG. 4 illustrates a flowchart of an example method 400 of analyzing precoding performance based on beamforming feedback, in accordance with one or more embodiments of the present disclosure.

At block 410, first beamforming feedback that is based on a first sounding signal using a first precoding technique may be obtained from a station (or other beamformee). For example, based on receiving the first sounding signal processed using the first precoding technique, the station may determine channel information and send the first beamforming feedback regarding the channel as $V_1$, $S_1$.

At block 420, second beamforming feedback that is based on a second sounding signal using a second precoding technique may be obtained from the station (or other beamformee). For example, based on receiving the second sounding signal processed using the second precoding technique, the station may determine channel information and send the second beamforming feedback regarding the channel as $V_2$, $S_2$.

At block 430, performance as indicated by the first beamforming feedback may be analyzed in view of performance as indicated by the second beamforming feedback. For example, an analysis of the SNR as indicated by analyzing $S_2$ and $S_1$ may indicate the performance. As another example, an analysis of $V_2$ and $V_1$ to the identity matrix may indicate the performance. Any analysis and/or combinations of analyses may be utilized to assess and/or analyze the performance as indicated by the first beamforming feedback and/or the second beamforming feedback.

At block 440, a determination may be made as to which precoding technique had superior performance between the first and second precoding techniques. If the first precoding technique had superior performance, the method 400 may proceed to the block 450. If the second precoding technique had superior performance, the method 400 may proceed to the block 460.

At block 450, the first precoding technique may be used to facilitate beamforming of signals when communicating with the station (or other beamformee).

At block 460, the second precoding technique may be used to facilitate beamforming of signals when communicating with the station (or other beamformee).

Figure 5:
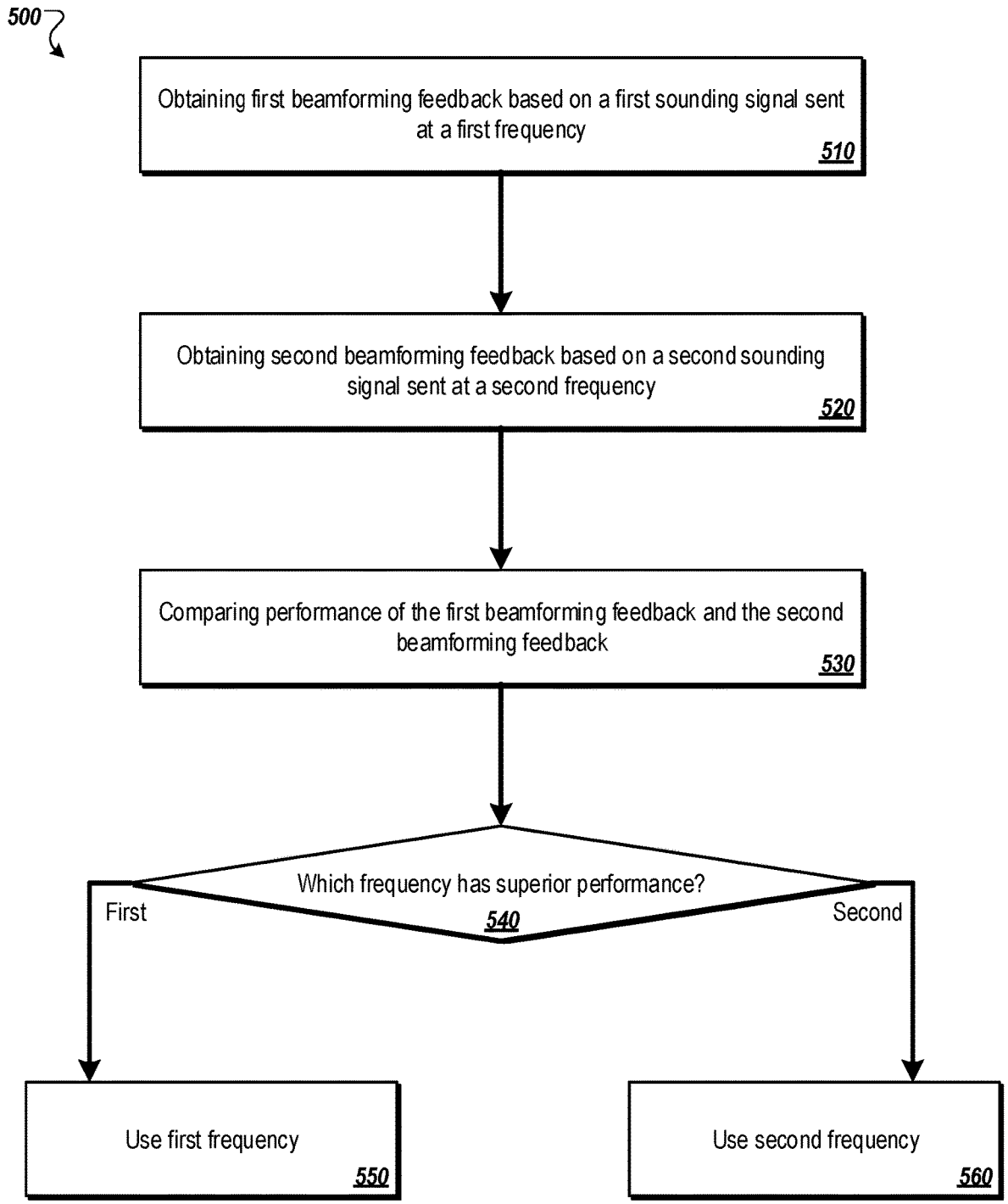
FIG. 5 illustrates a flowchart of an example method of analyzing frequency performance based on beamforming feedback.

FIG. 5 illustrates a flowchart of an example method 500 of analyzing frequency performance based on beamforming feedback, in accordance with one or more embodiments of the present disclosure.

At block 510, first beamforming feedback that is based on a first sounding signal sent at a first frequency may be obtained from a station (or other beamformee). For example, based on receiving the first sounding signal sent at the first frequency, the station may determine channel information and send the first beamforming feedback regarding the channel as $V_1$, $S_1$.

At block 520, second beamforming feedback that is based on a second sounding signal sent at a second frequency may be obtained from the station (or other beamformee). For example, based on receiving the second sounding signal at the second frequency, the station may determine channel information and send the second beamforming feedback regarding the channel as $V_2$, $S_2$.

At block 530, performance as indicated by the first beamforming feedback may be analyzed in view of performance as indicated by the second beamforming feedback. The block 530 may be similar or comparable to the block 430.

At block 540, a determination may be made as to which frequency had superior performance between the first and second frequencies. If the first frequency had superior performance, the method 500 may proceed to the block 550. If the second frequency had superior performance, the method 500 may proceed to the block 560.

At block 550, the first frequency may be used to communicate with the station (or other beamformee).

At block 560, the second frequency may be used to communicate with the station (or other beamformee).

Figure 6:
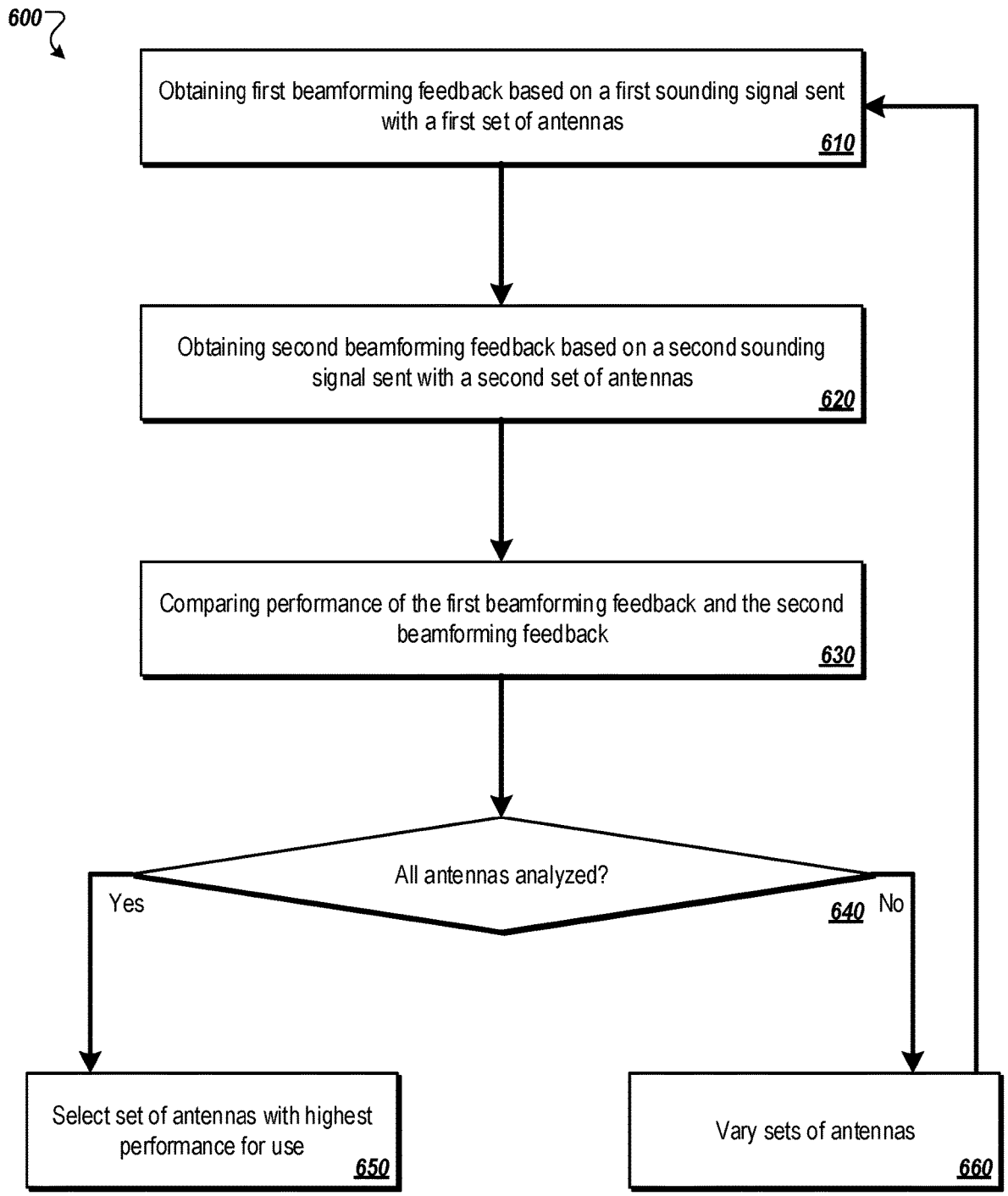
FIG. 6 illustrates a flowchart of an example method of analyzing antenna performance based on beamforming feedback.

FIG. 6 illustrates a flowchart of an example method 600 of analyzing antenna performance based on beamforming feedback, in accordance with one or more embodiments of the present disclosure.

At block 610, first beamforming feedback that is based on a first sounding signal sent using a first set of antennas may be obtained from a station (or other beamformee). For example, based on receiving the first sounding signal sent using the first set of antennas, the station may determine channel information and send the first beamforming feedback regarding the channel as $V_1$, $S_1$. In some embodiments, the first set of antennas may include a subset of less than all available antennas of the beamformer (such as antennas 1-4 of 8 potential antennas). In some embodiments, the first set of antennas may include a configuration of antennas (such as operating the antennas as two 4×4 arrays of antennas or an 8×8 array of antennas).

At block 620, second beamforming feedback that is based on a second sounding signal sent using a second set of antennas may be obtained from the station (or other beamformee). For example, based on receiving the second sounding signal sent using the second set of antennas, the station may determine channel information and send the second beamforming feedback regarding the channel as $V_2$, $S_2$.

At block 630, performance as indicated by the first beamforming feedback may be analyzed in view of performance as indicated by the second beamforming feedback. The block 630 may be similar or comparable to the block 430. In some embodiments, any number of sets of antennas and/or individual antennas may have their performance as indicated by various beamforming feedback analyzed at the block 630.

At block 640, a determination may be made whether all sets of antennas and/or all antennas have been analyzed. If all antennas have been analyzed, the method 600 may proceed to the block 650. If less than all of the antennas have been analyzed, the method 600 may proceed to the block 660.

At block 650, the set of antennas (or antenna) with the highest performance may be selected for use in communicating with the station. For example, a given array of antennas, or configuration of antennas, may be selected at the block 650.

At block 660, the sets of antennas may be varied and the method 600 may return to the block 610. For example, based on the analysis of the block 630, the higher performing set of antennas may be identified and the lower performing set of antennas may be modified. In these and other embodiments, additional feedback regarding a set of antennas whose performance has already been identified may or may not be used to obtain additional beamforming feedback (e.g., the block 620 may be skipped for such a set of antennas). In some embodiments, the variation may include selecting a different set of antennas (e.g., changing from antennas 1-4 to antennas 2-5), changing an antenna configuration (e.g., changing from two 4×4 arrays to one 8×8 array of antennas), changing a broadcast power, or any combinations thereof.

Figure 7:
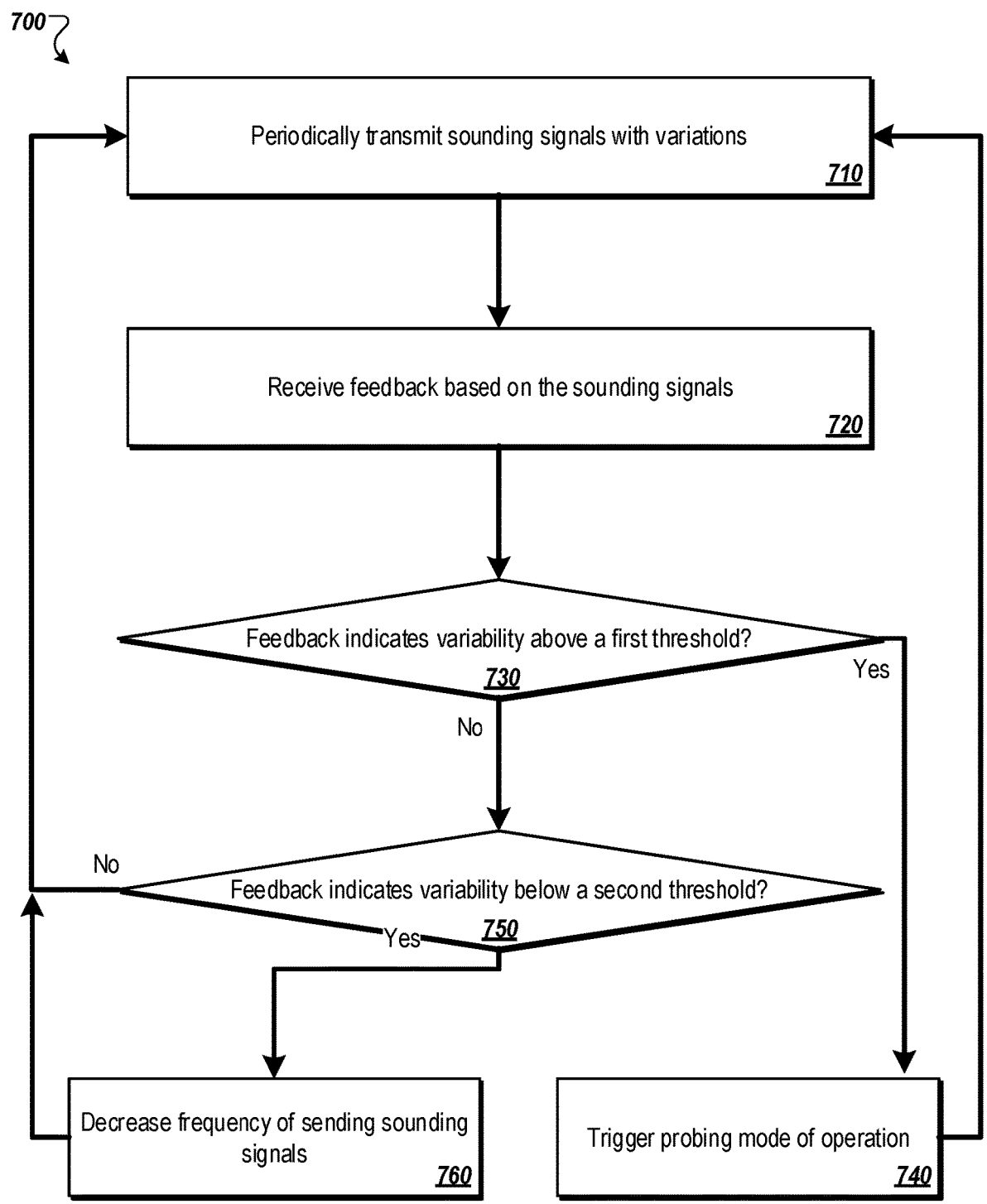
FIG. 7 illustrates a flowchart of an example method of varying timing of seeking beamforming feedback.

FIG. 7 illustrates a flowchart of an example method 700 of varying timing of seeking beamforming feedback, in accordance with one or more embodiments of the present disclosure.

At block 710, a beamformer periodically transmits sounding signals with variations. For example, the different sounding signals may be processed using different precoding techniques. As another example, the different sounding signals may be transmitted using different antenna(s), sets of antennas, and/or different antenna configurations. As an additional example, the different sounding signals may be transmitted at different frequencies and/or using different RUs. It will be appreciated that any variable aspect of the transmission modality of the sounding signals may be varied within the scope of the present disclosure. Additionally or alternatively, in some embodiments the block 710 may include periodically transmitting sounding signals without variations in the sounding signals, for example, to monitor stability of the communication channel.

At block 720, feedback may be received based on the sounding signals. For example, one or more beamformees may respond with beamforming feedback each time that the sounding signals are received. In these and other embodiments, the beamforming feedback may be of the form V, S.

At block 730, a determination may be made whether feedback indicates variability above a first threshold. For example, two successive beamforming feedbacks may be analyzed using values of V and/or S to make the determination. An example of the detection of variability is illustrated in FIG. 2A as the transition between the stationary period 220 and the period of motion 230. The determination of variability above the first threshold may indicate a detection of a high degree of variability or instability. If the feedback indicates variability above the first threshold, the method 700 may proceed to the block 740. If the feedback does not indicate variability above the first threshold, the method 700 may proceed to the block 750.

At block 740, a probing mode of operation may be triggered based on the variability detected at the block 730 and may then return to the block 710 to continue to send sounding signals in the probing mode of operation. For example, the probing mode of operation may include the beamformer to increase the frequency at which sounding signals are transmitted and/or may cause larger variations in the transmission of the sounding signals. In these and other embodiments, the high degree of variability detected at the block 730 may benefit from the probing mode of operation because increased frequency and/or variation in processing of the sounding signals may help identify a desirable precoding technique, antenna(s), etc., which may change due to the variability.

At block 750, a determination may be made whether the feedback indicates variability below a second threshold. For example, two successive beamforming feedbacks may be analyzed using values of V and/or S to make the determination. An example of the detection of the low amount of variability is also illustrated in FIG. 2A, but would be the transition between the stationary period 220 and the period of motion 230 in reverse. The determination of variability below the second threshold may indicate a detection of a high degree of stability in the communication channel between the beamformee and the beamformer. If the feedback indicates variability below the second threshold, the method 700 may proceed to the block 760. If the feedback does not indicate variability below the second threshold, the method 700 may return to the block 710 to continue to periodically transmit sounding signals.

At block 760, the frequency at which sounding signals are sent (e.g., how often) may be decreased and may return to the block 710 to continue to transmit sounding signals but at a decreased frequency. For example, the determination that the based on the high degree of stability detected at the block 750 such that feedback may not be useful as frequently and the frequency of sounding signals may be decreased to preserve power and increase the amount of time that is spent communicating data packets rather than the sounding signals and beamforming feedback.

Figure 8:
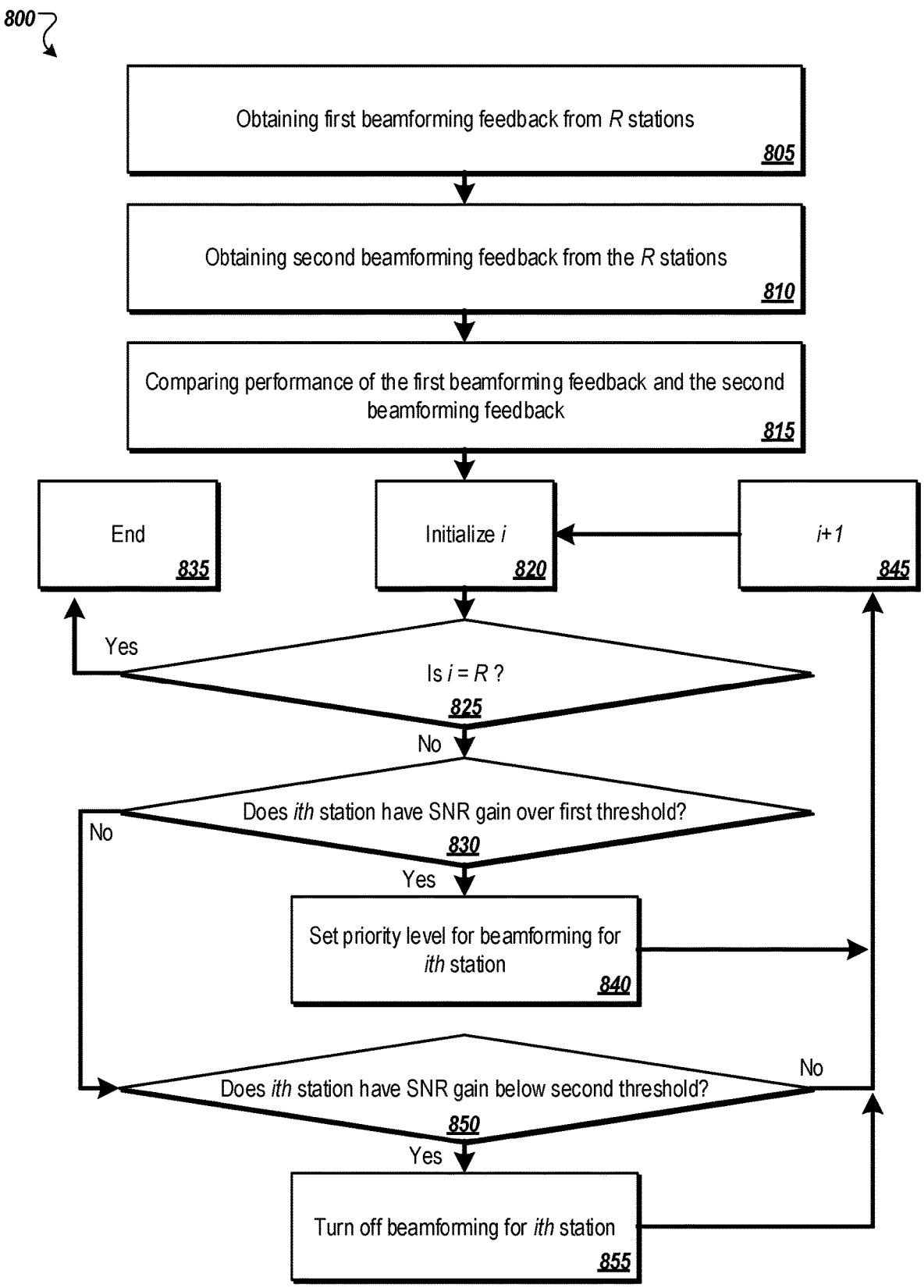
FIG. 8 illustrates a flowchart of an example method of determining beamforming performance involving multiple beamformees.

FIG. 8 illustrates a flowchart of an example method 800 of determining beamforming performance involving multiple beamformees, in accordance with one or more embodiments of the present disclosure.

At block 805, first beamforming feedback may be obtained from R stations (or other beamformees). For example, in response to one or more sounding signals sent by an AP (or other beamformer) the R stations may provide feedback to the AP. For each of the stations, the feedback may take the form $V_1$, $S_1$.

At block 810, second beamforming feedback may be obtained from the R stations (or other beamformees). For example, in response to one or more additional sounding signals sent by the AP (or other beamformer) the R stations may provide the second beamforming feedback to the AP. For each of the stations, the feedback may take the form $V_2$, $S_2$.

At block 815, the performances of the communication channels between the R stations and the APs as indicated by the first beamforming feedback and the second beamforming feedback may be obtained and/or analyzed. For example, for a given station, the values of $S_2$ and $S_1$ may be analyzed.

At block 820, a variable i may be initialized.

At block 825, a determination may be made whether/ equals K. or in other words, if each of the stations have been considered. If/docs not equal K, the method 800 may proceed to the block 830. If i equals R, the method 800 may proceed to the block 835 where the method 800 may end.

At block 830, a determination may be made whether the $i^{th}$ station has an SNR gain over a first threshold. For example, for the $i^{th}$ station, the difference in the values of $S_1$ and $S_2$ may be analyzed in view of a first threshold amount of SNR gain. Such a value may be indicative of how beneficial the beamforming is for the $i^{th}$ station. If the $i^{th}$ station has an SNR gain over the first threshold, the method 800 may proceed to the block 840. If the $i^{th}$ station does not have an SNR gain over the first threshold, the method 800 may proceed to the block 850.

At block 840, a priority level may be set for beamforming for the $i^{th}$ station. For example, based on a high SNR gain (e.g., because the SNR is above the first threshold), the priority level may be high for the $i^{th}$ station such that beamforming may be more important for the $i^{th}$ station than for other stations.

At block 845, the value of i may be incremented such that the next station may be considered and/or the beamforming associated therewith may be prioritized (and/or turned off).

At block 850, a determination may be made whether the $i^{th}$ station has an SNR gain below a second threshold. If the $i^{th}$ station has an SNR gain below the second threshold, the method 800 may proceed to the block 855. If the $i^{th}$ station does not have an SNR below the second threshold, the method 800 may return to the block 845 to consider a next station.

At block 855, the beamforming for the $i^{th}$ station may be turned off. For example, based on a relatively small gain in SNR using beamforming for the $i^{th}$ station, the beamforming may be turned off for the $i^{th}$ station, thereby preserving power and computational resources of the AP and/or $i^{th}$ station.

By using the method 800, each of the R stations may be generally categorized into three (or more) groups: high priority beamformees due to a high SNR gain, normal beamformees due to some SNR gain, and low priority beamformees for which beamforming may or may not be turned off because of a low gain in SNR.

While examples are provided of analyses and corresponding actions that may be taken, it will be appreciated that the present disclosures contemplates any such analysis and/or corresponding actions that may be taken based on successive beamforming feedback analyses.

One skilled in the art will appreciate that, for these and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

Figure 9:
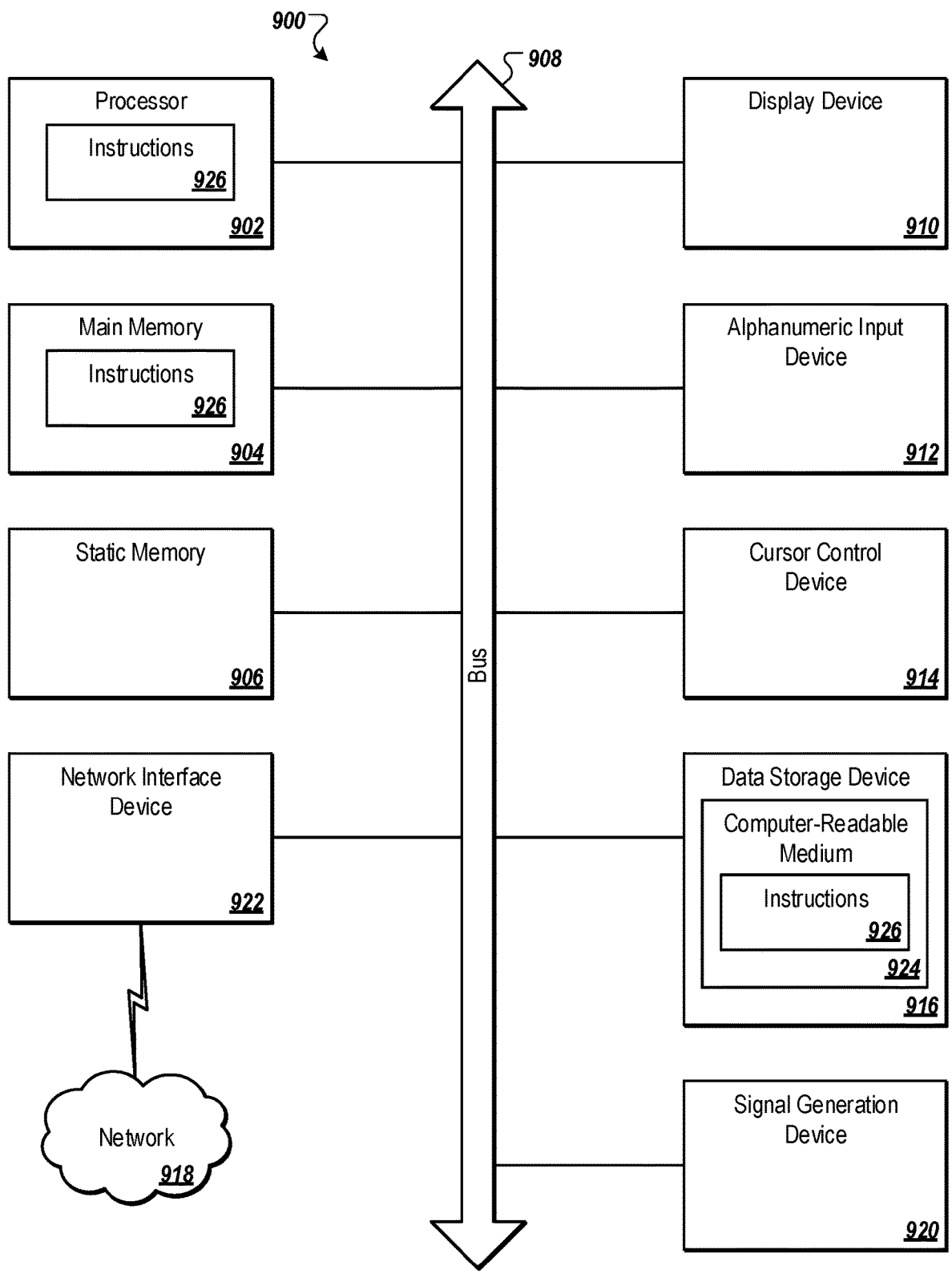
FIG. 9 illustrates a diagrammatic representation of a machine in the example form of a computing device, all according to at least one implementation described in the present disclosure.

FIG. 9 illustrates a diagrammatic representation of a machine in the example form of a computing device 900 within which a set of instructions, for causing the machine to perform any one or more of the methods discussed herein, may be executed. The computing device 900 may include a mobile phone, a smart phone, a netbook computer, a rackmount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 916, which communicate with each other via a bus 908.

Processing device 902 represents one or more general-purpose processing devices such as a microprocessor, central processing unit, or the like. More particularly, the processing device 902 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also include one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computing device 900 may further include one or more network interface devices 922 which may communicate with one or more networks 918. The computing device 900 also may include a display device 910 (e.g., a liquid crystal display (LCD) or a cathode ray tube (CRT)), an alphanumeric input device 912 (e.g., a keyboard), a cursor control device 914 (e.g., a mouse) and a signal generation device 920 (e.g., a speaker). In at least one embodiment, the display device 910, the alphanumeric input device 912, and/or the cursor control device 914 may be combined into a single component or device (e.g., an LCD touch screen).

The data storage device 916 may include a computer-readable storage medium 924 on which is stored one or more sets of instructions 926 embodying any one or more of the methods or functions described herein. The instructions 926 may also reside, completely or at least partially, within the main memory 904 and/or within the processing device 902 during execution thereof by the computing device 900, the main memory 904 and the processing device 902 also constituting computer-readable media. The instructions may further be transmitted or received over a network 918 via the network interface device 922.

While the computer-readable storage medium 924 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

An example apparatus can be multiple-input multiple-output (MIMO) apparatus supporting as many as N×N discrete communication streams over N antennas. In an example the MIMO apparatus signal processing units can be implemented as N×N. In various embodiments, the value of N can be 4, 6, 8, 12, 16, etc. Extended MIMO operation enable the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

In some embodiments, when operating in a multi-user MIMO (MU-MIMO) configuration, the principles of the present disclosure may be used to not only increase the effectiveness of beamforming towards one of the stations, but may additionally or alternatively be used to minimize or reduce noise to other stations. For example, when analyzing performance of different precoding techniques, the SNR with a first station over a first channel as well as the noise or other interference caused with a second station over a second channel may be considered when determining which precoding technique to use. As another example, the interference and/or noise introduced on other channels may be the sole basis upon which the precoding technique is selected. As a further example, an AP may select a subset of all stations serviced as those which will receive beamforming and disable beamforming for others, and the determination of which stations receive beamforming may be based on selecting the stations indicating the largest gain in SNR using beamforming. Additionally or alternatively, the stations for which beamforming is disabled may be based on selecting the stations indicating the lowest gain in SNR using beamforming.

Channel State Information (CSI) from any of the devices described in this disclosure can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined to enhance system functionality and/or to produce complementary functions. Such combinations will be readily appreciated by those skilled in the art given the totality of the foregoing description. Likewise, aspects of the implementations may be implemented in standalone arrangements where more limited and thus specific component functionality is provided within each of the interconnected—and therefore interacting—system components albeit that, in sum, they together support, realize and produce the described real-world effect(s). Indeed, it will be understood that unless features in the particular implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will, therefore, be appreciated that the above description has been given by way of example only and that modification in detail may be made within the scope of the present disclosure.

The subject technology of the present disclosure is illustrated, for example, according to various aspects described below. Various examples of aspects of the subject technology are described as numbered examples (1, 2, 3, etc.) for convenience. These are provided as examples and do not limit the subject technology. It is noted that any of the dependent examples or portions thereof may be combined in any combination, and placed into an independent examples, e.g., Examples 1, 2, and 3. The other examples can be presented in a similar manner. The following is a non-limiting summary of some examples presented herein.

Example 1 includes a method that may include determining a first precoding processing for communication between a beamformer and a beamformee, and transmitting a first sounding signal precoded according to the first precoding processing. The method may additionally include obtaining first beamforming feedback from the beamformee in response to the first sounding signal precoded according to the first precoding processing, and selecting a second precoding processing for communication between the beamformer and the beamformee. The method may also include obtaining second beamforming feedback from the beamformee based on a second sounding signal precoded according to the second precoding processing, and analyzing the first beamforming feedback and the second beamforming feedback. The method may additionally include deriving a quality score of the second precoding processing based on the analysis of the first beamforming feedback and the second beamforming feedback, and selecting the second precoding processing instead of the first precoding processing based on the quality score of the second precoding processing.

Example 2 includes a digital communication system that may include one or more processors, and one or more non-transitory computer-readable media containing instructions that, when executed by the one or more processors, are configured to cause the digital communication system to perform operations. The operations may include determining a first precoding processing for communication between the digital communication system and a beamformee, and transmitting a first sounding signal precoded according to the first precoding processing. The operations may also include obtaining first beamforming feedback from the beamformee in response to the first sounding signal transmitted by the digital communication system, and selecting a second precoding processing for communication between the digital communication system and the beamformee. The operations may also include obtaining second beamforming feedback from the beamformee based on a second sounding signal from the digital communication system and precoded according to the second precoding processing, analyzing the first beamforming feedback and the second beamforming feedback, and deriving a quality score of the second precoding processing based on the analysis of the first beamforming feedback and the second beamforming feedback. The operations may also include selecting the second precoding processing instead of the first precoding processing based on the quality score of the second precoding processing Example 3 includes one or more non-transitory computer-readable media containing instructions that, when executed by one or more processors, cause a system to perform one or more operations. The operations may include determining a first precoding processing for communication between a beamformer and a beamformee, and transmitting a first sounding signal precoded according to the first precoding processing. The operations may also include obtaining first beamforming feedback from the beamformee in response to the first sounding signal transmitted by the digital communication system, and selecting a second precoding processing for communication between the digital communication system and the beamformee. The operations may also include obtaining second beamforming feedback from the beamformee based on a second sounding signal from the digital communication system and precoded according to the second precoding processing, analyzing the first beamforming feedback with the second beamforming feedback, and deriving a quality score for each of the first and the second precoding processings based on the analysis of the first beamforming feedback and the second beamforming feedback. The operations may additionally include selecting the first precoding processing instead of the second precoding processing based on a relation between the quality scores of the first and the second precoding processings.

An example method can include selecting an optimal precoding process for wireless communication between an access point and a wireless station based on quality scores based on sounding communications between the access point and the wireless station; and calibrating the access point to wireless communicate with the wireless station based on the selected optimal precoding process. The method can include wherein the quality scores indicate differences in beamformed wireless communications performance between the access point and the wireless station. The method can include wherein the access point beamforms wireless communications with multiple wireless stations.

Another example method can include deriving beamforming quality scores based on sounding feedback with a wireless station; selecting an optimal precoding process for wireless communication based on the beamforming quality scores; precoding communications with the wireless station based on the selected optimal precoding process.

Further, another example method can include analyzing multiple sounding communications between a beamformer and a beamformee in a wireless network to derive a precoding quality score associated with each sounding communication of the multiple sounding communications; selecting an optimal precoding process based on the derived quality scores; and precoding, by the beamformer, wireless communication with the selected optimal precoding process. The method can include wherein the derived precoding quality score associated with each sounding communication indicates a beamforming performance for wireless communications between the beamformer and the beamformee. The method can include wherein at least one sounding communication of the multiple sounding communications include a different precoding processing; and the derived precoding quality score associated with each sounding communication indicates a beamforming performance difference between the different precoding processing for wireless communications between the beamformer and the beamformee. The method can include wherein analyzing the multiple sounding communications comprises determining a signal strength associated with each sounding communication, and to derive the precoding quality score is based on the signal strength in view of a gain threshold. The method can include wherein the beamformer is a wireless access point and the beamformee is a wireless station device.

An example station method can include providing, by a wireless station, multiple sounding feedback to an access point; receiving wireless communications from the access point, wherein the wireless communications are precoded based on a derived quality score from analysis of the multiple sounding feedback. The example station method can include wherein the multiple sounding feedback are in response to sounding requests from the access point. The example station method can include wherein the wireless communications are precoded to optimize beamforming with the access point. The example station method can include wherein the wireless communications are precoded to without beamforming with the access point.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present disclosure may be embodied in other specific forms without departing from its spirit or essential characteristics. The described implementations are to be considered in all respects only as illustrative and not restrictive. The scope of the present disclosure is, therefore, indicated by the appended claims rather than by the foregoing description. All changes which come within the meaning and range of equivalency of the claims are to be embraced within their scope.

What is claimed is:

1. A method comprising:
    determining a first precoding processing for communication between a beamformer and a beamformee;
    transmitting a first sounding signal precoded according to the first precoding processing;
    obtaining first beamforming feedback from a beamformee in response to the first sounding signal precoded according to the first precoding processing;
    selecting a second precoding processing for communication between the beamformer and the beamformee;
    obtaining second beamforming feedback from the beamformee based on a second sounding signal precoded according to the second precoding processing;
    analyzing the first beamforming feedback and the second beamforming feedback;
    deriving a quality score of the second precoding processing based on the analysis of the first beamforming feedback and the second beamforming feedback; and
    selecting the second precoding processing instead of the first precoding processing based on the quality score of the second precoding processing.

2. The method of claim 1, wherein determining the first precoding processing is based on implicit sounding by observing an uplink channel between the beamformee and the beamformer.

3. The method of claim 1, wherein determining the first precoding processing is based on an explicit sounding signal feedback received in response to an explicit sounding signal.

4. The method of claim 1, wherein deriving the quality score of the second precoding processing includes analyzing a first signal strength associated with the first beamforming feedback and a second signal strength associated with the second beamforming feedback.

5. The method of claim 4, further comprising disabling beamforming between the beamformer and the beamformee based on a difference between the second signal strength and the first signal strength being below a gain threshold.

6. The method of claim 5, wherein the beamformer operates in a multi-user multi-input multi-output (MU-MIMO) context, and wherein the gain threshold is variable based on differences in signal strength for other beamformees communicating with the beamformer using beamforming.

7. The method of claim 4, wherein the first beamforming feedback is associated with communicating over a first frequency and the second beamforming feedback is associated with communicating over a second frequency, and the first frequency is selected for communicating between the beamformer and the beamformee based on the first signal strength being higher than the second signal strength.

8. The method of claim 1, further comprising periodically obtaining additional beamforming feedback.

9. The method of claim 8, wherein the additional beamforming feedback is obtained at a first frequency in a normal mode of operation and at a second frequency that is more frequent than the first frequency in a debugging mode of operation.

10. The method of claim 8, further comprising:
monitoring stability of the additional beamforming feedback; and
predicting periods of motion of the beamformee based on periods of instability in the additional beamforming feedback.

11. The method of claim 1, wherein the first sounding signal is transmitted using a first combination of antennas of the beamformer and the second sounding signal is transmitted using a second combination of antennas of the beamformer.

12. The method of claim 11, further comprising deriving performance of a given antenna based on the analysis of the first beamforming feedback and the second beamforming feedback.

13. The method of claim 12, further comprising selecting a subset of all antennas of the beamformer to be used when communicating with the beamformee based on the performance of at least two of the antennas of the beamformer.

14. A digital communication system, comprising:
one or more processors; and
one or more non-transitory computer-readable media containing instructions that, when executed by the one or more processors, are configured to cause the digital communication system to perform operations, the operations comprising:
determining a first precoding processing for communication between the digital communication system and a beamformee;
transmitting a first sounding signal precoded according to the first precoding processing;
obtaining first beamforming feedback from the beamformee in response to the first sounding signal precoded according to the first precoding processing;
selecting a second precoding processing for communication between the digital communication system and the beamformee;
obtaining second beamforming feedback from the beamformee based on a second sounding signal from the digital communication system precoded according to the second precoding processing;
analyzing the first beamforming feedback and the second beamforming feedback;
deriving a quality score of the second precoding processing based on the analysis of the first beamforming feedback and the second beamforming feedback; and
selecting the second precoding processing instead of the first precoding processing based on the quality score of the second precoding processing.

15. The digital communication system of claim 14, wherein deriving the quality score of the second precoding processing includes analyzing a first signal strength associated with the first beamforming feedback and a second signal strength associated with the second beamforming feedback.

16. The digital communication system of claim 15, wherein the operations further comprise disabling beamforming between the digital communication system and the beamformee based on a difference between the second signal strength and the first signal strength being below a gain threshold.

17. The digital communication system of claim 16, wherein the digital communication system operates in a multi-user multi-input multi-output (MU-MIMO) context, and wherein the gain threshold is variable based on differences in signal strength for other beamformees communicating with the digital communication system using beamforming.

18. The digital communication system of claim 15, wherein the first beamforming feedback is associated with communicating over a first frequency and the second beamforming feedback is associated with communicating over a second frequency, and the first frequency is selected for communicating between the digital communication system and the beamformee based on the first signal strength being higher than the second signal strength.

19. One or more non-transitory computer-readable media containing instructions that, when executed by one or more processors, are configured to cause a system to perform operations, the operations comprising:
determining a first precoding processing for communication between a beamformer and a beamformee;
transmitting a first sounding signal precoded according to the first precoding processing;
obtaining first beamforming feedback from the beamformee in response to the first sounding signal precoded according to the first precoding processing;
selecting a second precoding processing for communication between the beamformer and the beamformee;
obtaining second beamforming feedback from the beamformee based on a second sounding signal from the beamformer precoded according to the second precoding processing;
analyzing the first beamforming feedback and the second beamforming feedback; and
deriving a quality score for each of the first and the second precoding processings based on the analysis of the first beamforming feedback and the second beamforming feedback; and
selecting the first precoding processing instead of the second precoding processing based on a relation between the quality scores of the first and the second precoding processings.

20. The non-transitory computer-readable media of claim 19, wherein the operations further comprise sending a message to another beamformer in a mesh network indicating that the other beamformer is no longer to service the beamformee based on the quality score of the first precoding processing.

* * * * *